Dec. 29, 1970     D. E. PRUETT     3,550,278

PIPE INTERSECTION MARKER

Filed Nov. 4, 1968     3 Sheets-Sheet 1

INVENTOR.
DONALD E. PRUETT

Dec. 29, 1970   D. E. PRUETT   3,550,278
PIPE INTERSECTION MARKER
Filed Nov. 4, 1968   3 Sheets-Sheet 2
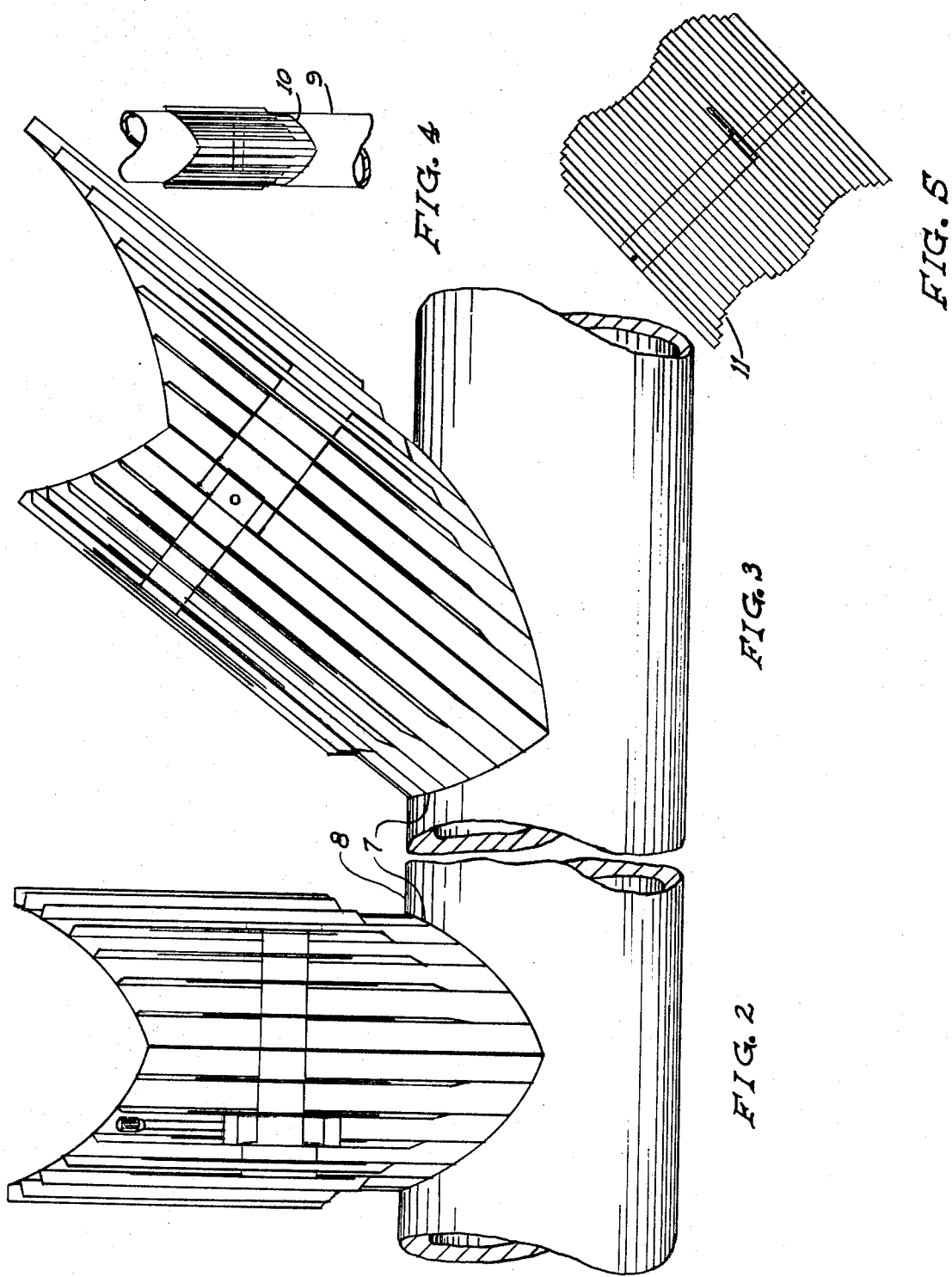
INVENTOR.
DONALD E. PRUETT

INVENTOR
DONALD E. PRUETT

United States Patent Office 3,550,278
Patented Dec. 29, 1970

3,550,278
PIPE INTERSECTION MARKER
Donald E. Pruett, P.O. Box 183, Daphne, Ala. 36526
Filed Nov. 4, 1968, Ser. No. 773,702
Int. Cl. G01b 5/20
U.S. Cl. 33—175                                        1 Claim

ABSTRACT OF THE DISCLOSURE

A geometric tool that represents a cylinder, comprising a plurality of wedge shaped ribs, the ribs being wedge shaped to form a cylinder when assembled, the ribs having longitudinal slots, a belt passing through said slots, thereby to permit movement longitudinal between the ribs and the belt and the ribs relative to each other, said ribs having a longitudinal boss or ridge along each side to assure that said ribs maintain a parallel position relative to each other, said belt having an adjustable locking device to change the belt length, belt length adjustment being desirable to change the tension on the ribs, "tension" on the ribs causes friction between the ribs, friction being necessary to keep the "ends" of the ribs in a set position.

---

This invention relates to a tool that can be used to represent a cylinder that will show the true line or lines of intersection between the cylinder and another object. Though not limited to pipe fitting, this tool may be most useful for this purpose.

An object of the invention is to show the intersection lines of a pipe with another pipe and how the two pipes should be cut to fit together for welding.

Another object of the invention is to show how a flat surface, such as sheet metal, would be cut to fit a given object after it is rolled into a cylinder.

A further object is to show the true shape of the surface of a cylinder projected onto a flat surface at an angle other than 90 degrees, such as required for drafting.

With the foregoing objects and others that will appear as the description proceeds, this invention consists of certain novel details of construction and combinations of parts hereinafter more fully described and pointed out in the claims. It is understood that changes may be made in the construction and arrangement of parts without departing from the spirit of the invention as claimed.

In the accompanying drawings the preferred form of the invention has been shown.

In said drawings:

FIG. 2 is a view of the tool showing how it would be used to show the intersection line between two pipes intersecting at 90 degrees.

FIG. 3 is a view of the tool showing how it would be used to show the intersection lines of two pipes that intersect at an angle other than 90 degrees.

FIG. 4 is a view of the tool as it would be used to mark the end of a pipe for cutting to fit another pipe.

FIG. 5 shows the tool laid out as it would be on a flat surface, the flat surface to be rolled into a cylinder to fit another surface.

Figure 1:
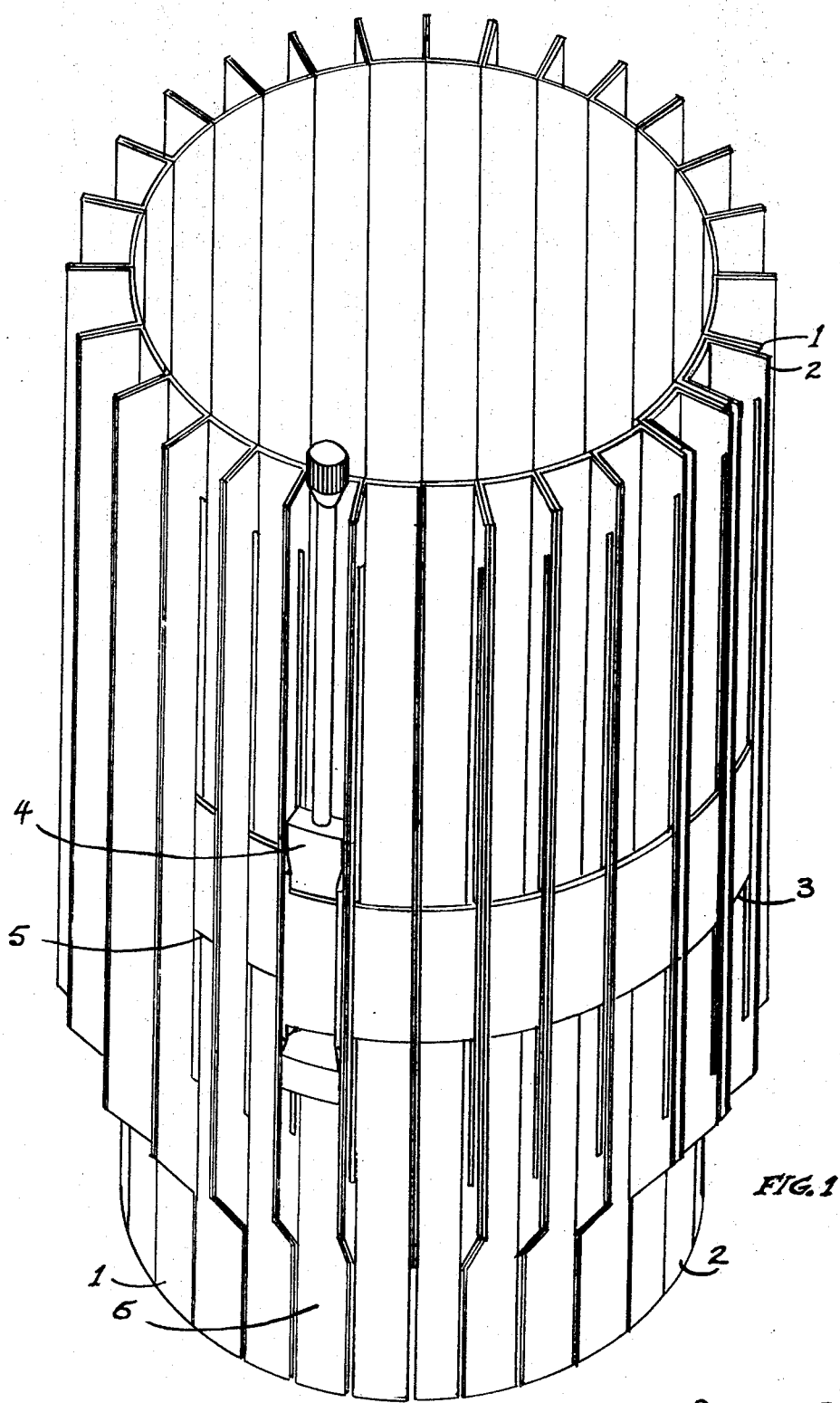
FIG. 1 is a general view of the tool as it appears when not in use.

The tool is made up of a number of ribs, 1 and 2, held in place by a belt, 3, as shown in FIG. 1. An adjusting lock 4, FIG. 1, sets the tension on the ribs. The ribs and belt are made of a spring type metal or possibly plastic. Some tension is required to keep the ends of the ribs in their same relative position after they have been set to fit a given object. Ribs 2 are shown meshed into ribs 1. As can be seen, the diameter of the tool can be changed by changing the number of number 2 ribs meshed into the number 1 ribs. It is not intended that one tool should or could form all possible diameters. One tool can form more than one diameter, the circumference varying in one rib width increments.

In practice the tool would be placed on a pipe or other object as shown in FIG. 2 or 3. Each rib would then be slid along its adjoining rib until their ends contacted the pipe. The line formed at 7, FIG. 2 or 3 would be the true line of intersection between the pipe represented by the tool and the pipe. The pipe would be marked at line 7, it would then be cut with a torch along this line. The opening formed would fit the pipe represented by the tool.

The tool, after being removed from pipe 8, would maintain its shape. The tool would then be slipped over the end or wrapped around a pipe as in FIG. 4. Pipe 9 would be marked along line 10 and then cut with a torch. It is obvious that the end of pipe 9 could be fitted to the opening that had been cut in pipe 8 and the two pieces joined together by welding.

A further demonstration of the tools use is indicated by FIG. 5. If the tool is removed from pipe 8, FIG. 2, unrolled and laid on a flat surface such as sheet metal, the sheet metal could be marked and cut along line 11. When the sheet is rolled into a cylinder, it will have the desired shape to fit the pipe or surface the tool has been previously fitted to.

Not shown in the drawings is the tool's use as a drafting instrument. It is obvious that the instrument could be used to project the shape of a cylinder intersecting a plane at any angle.

The ribs of the tool are wedge shaped to give a cylinder shape when assembled and to supply the tension required to hold the ribs in their relative position. The boss or ridge, 12, FIG. 6, along each rib will mesh with the boss along the adjoining rib. These bosses will assure that each rib stays parallel with the adjoining rib. The bosses on the ribs 2 are located slightly lower on rib walls to assure that they match the bosses on the ribs 1 when the two ribs are meshed.

It will be noted that the ribs are numbered 1 and 2. The difference in these ribs can be seen in FIG. 6. The belt slot 13 in the number 2 ribs is at the top of the rib. This allows the ribs 2 to mesh into the ribs 1. The belt slot 14 in the ribs 1 is at the bottom of the ribs. It is obvious that this locates the belt section 5 at the bottom of the ribs and this too is necessary to allow the ribs to mesh. The ribs 2 will be slightly smaller than the ribs 1 for obvious reasons.

Figure 6:
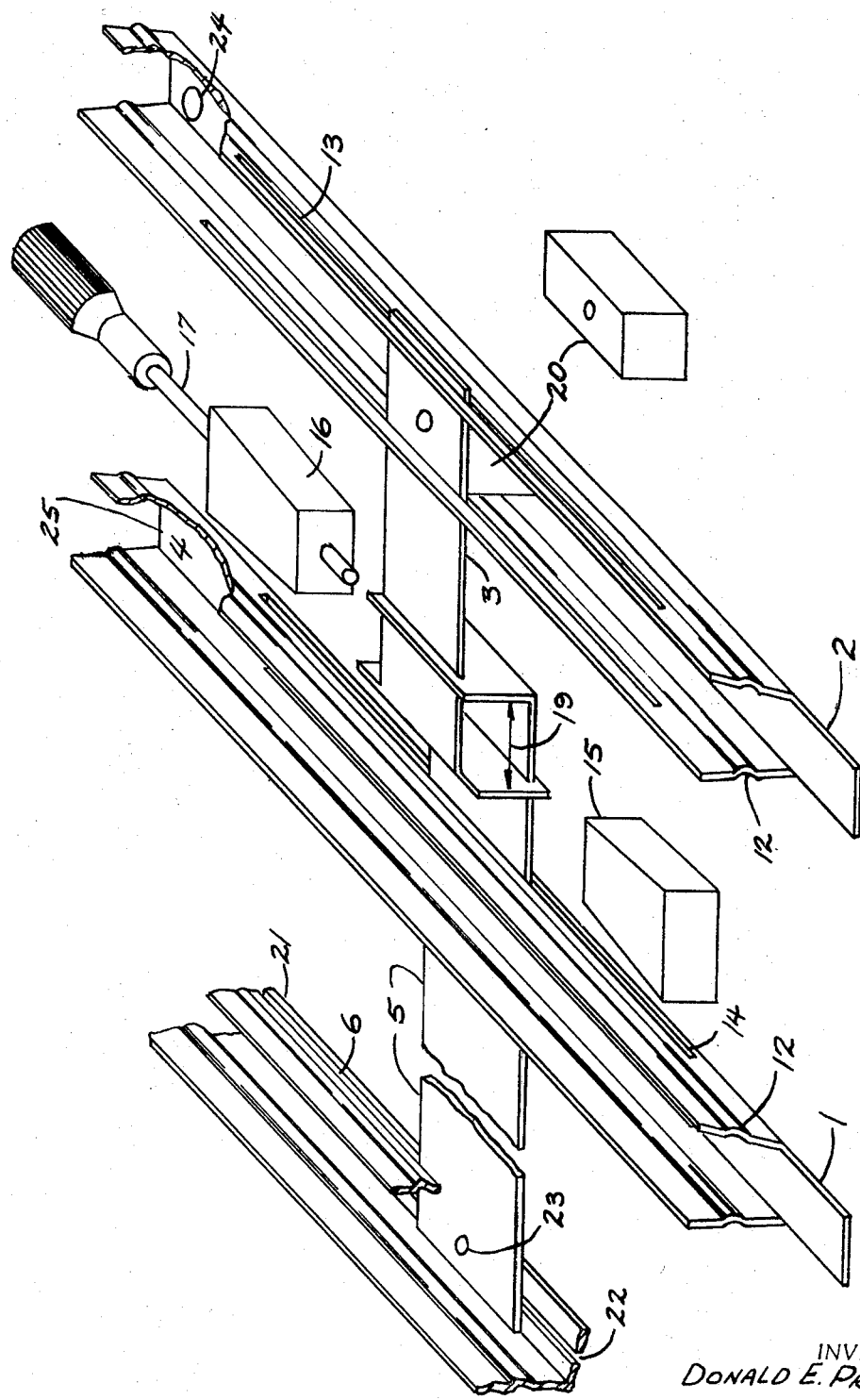
FIG. 6 shows the various parts of the tool and the unique features of their design.

The lock 4 in FIG. 1, is made up of three parts: two wedges 15 and 16 and screw 17 shown in FIG. 6. Wedge 16 is not threaded, wedge 15 is threaded. When screw 17 is screwed into wedge 15 the small ends of the wedges are pulled together, this increases the distance 19 and in effect shortens the length of the belt. Shortening the belt compresses the wedge shaped ribs, increases the tension on them and keeps them in their relative positions. The rib 6 in FIG. 1 is a special rib. It has a slot at the top on one side and at the bottom on the other. This allows the belt to lap as indicated in FIG. 6. This rib is also wider to accommodate the lock.

Number 20 in FIG. 6 is an anchor block for the section 3 of the belt. The "end" rib will slide along this block. Rib 21 FIG. 6 is a special rib with slot 22 in the bottom to carry rivet 23. This rib anchors section 5 of the belt.

The last rib on section 3 of the belt has a hole 24 to show the diameter of the tool when this rib is meshed into certain ribs 1. For instance when this rib is meshed into the rib 1 in FIG. 6, the number "4" at 25 would show in the hole 24. This would indicate that the inside diameter of the tool at this setting was 4 inches or the tool setting had a diameter the same as the outside diameter of 4 inch pipe.

What is claimed is:
1. A geometric tool for marking pipe intersection comprising a plurality of elongated generally wedge shaped ribs, each rib being formed of spring sheet material tending to maintain its shape having a flat bottom portion with flange portions extending outwardly from each side of the bottom portion to form a channel, said ribs being disposed in parallel side to side relation so that the flange of each rib is in contact with a flange of the adjacent rib along its length and the bottom portion of the ribs form a cylindrical tube, a longitudinal slot in each flange, all said slot being generally coextensive along the tube when said ribs are coextensive, a belt passing through said slots substantially narrower than said slots to permit relative longitudinal motion between said ribs, a ridge formed in each flange which will mesh with the ridge in the adjacent flange to maintain parallelism between the ribs during relative motion therebetween and an adjustable locking device for changing the belt length to adjust the tension of the belt and consequent friction between the rib flanges.

References Cited
UNITED STATES PATENTS

| | | | |
|---|---|---|---|
| 776,713 | 12/1904 | Wurts | 33—175 |
| 2,222,127 | 11/1940 | Turner | 33—175 |
| 2,552,043 | 5/1951 | Horvath | 33—175 |
| 2,615,256 | 10/1952 | Olson | 33—175 |
| 2,742,706 | 4/1965 | Rushing, Jr. | 33—175 |

SAMUEL S. MATTHEWS, Primary Examiner